United States Patent [19]
Moroff et al.

[11] 3,853,594
[45] Dec. 10, 1974

[54] METHOD FOR TREATING PAPER WITH MIXED THERMOPLASTIC AND THERMOSETTING ACRYLIC RESINS AND PRODUCTS THEREOF

[75] Inventors: Helmut Moroff, Trautheim near Darmstadt; Helmut Neumann, Darmstadt-Eberstadt, both of Germany

[73] Assignee: Rohm GmbH, Darmstadt, Germany

[22] Filed: July 7, 1972

[21] Appl. No.: 269,615

[30] Foreign Application Priority Data
July 14, 1971 Germany............................ 2135072

[52] U.S. Cl. ......... 117/64 R, 117/65.2, 117/155 UA
[51] Int. Cl............................................. B44d 1/44
[58] Field of Search ....... 117/64 C, 155 UA, 155 L, 117/60, 161 UC, 161 UN, 64 R, 65.2

[56] References Cited
UNITED STATES PATENTS
| | | | |
|---|---|---|---|
| 2,864,723 | 12/1958 | Flack et al. | 117/60 X |
| 3,004,868 | 10/1961 | Sumner et al. | 117/140 A |
| 3,028,258 | 4/1962 | Rice | 117/64 C |
| 3,110,612 | 11/1963 | Gottwald et al. | 117/64 C |
| 3,235,443 | 2/1966 | Greenman et al. | 162/135 |
| 3,249,463 | 5/1966 | Carlee | 117/76 T |
| 3,649,330 | 3/1972 | Drelich | 117/60 X |

FOREIGN PATENTS OR APPLICATIONS
1,165,222  9/1969  Great Britain ..................... 117/155

*Primary Examiner*—William D. Martin
*Assistant Examiner*—M. R. Lusignan
*Attorney, Agent, or Firm*—Curtis, Morris & Safford

[57] ABSTRACT

Methods for making glossy resin-filled paper by contacting the paper to be treated with an aqueous dispersion of a self-cross-linking resin and of a thermoplastic resin, then drying and hot calendering the treated paper. Glossy paper prepared by these methods and adaptable to use as an outer decorative layer in laminated building materials, for example.

9 Claims, No Drawings

METHOD FOR TREATING PAPER WITH MIXED THERMOPLASTIC AND THERMOSETTING ACRYLIC RESINS AND PRODUCTS THEREOF

The present invention relates to methods for making glossy resin-filled paper, and to the paper made by these methods.

More in particular, the invention is particularly useful for imparting a highly glossy surface to decorative paper. In the present specification, the term "decorative paper" is to be understood to pertain, in a narrow sense, to the decorative outer layer of multi-layered materials having a decorative surface and, in a broader sense, also to paper which is intended for use in the manufacture of multi-layer materials but which has not yet been joined to its supporting layers. Decorative papers may be uniformly white or colored or may be imprinted with monochrome or polychrome patterns or representations. As the supporting layers, synthetic resin-filled cardboard, fiberboard, chipboard, plywood, hard-foamed resin sheets, asbestos-cement plates, and the like can be employed, as well as multi-layer combinations of these materials. Multi-layer materials of this sort are widely used in the manufacture of furniture and useful objects, or for the interior decoration of vehicles, or of shops, prefabricated homes, and other buildings.

For the preparation of decorative paper, white, colored, or printed untreated paper is filled with a suitable synthetic resin and is bonded to a support. The processes of resin-filling and bonding can take place concurrently or consecutively, in either order. Thus, the untreated paper can be saturated with a solution or dispersion of the resin and then dried and hardened in contact with a support layer to form a bond therewith. However, the untreated paper may also be adhered to the support layer (which in every case results in a partial filling with resin or adhesive) and then subsequently impregnated with a resin-containing solution or dispersion, dried, and hardened. Finally, impregnation, drying, and hardening, as well as an optional final varnishing of the decorative paper, can all be carried out in the absence of the support layer, and the finished layers can then be bound to one another.

In order to prepare a surface having high gloss in the prior art, a decorative paper is as a rule coated with a nitrocellulose lacquer. Such lacquers are dissolved in flammable organic solvents and necessitate explosion-proof installations for their application and drying, and for the recovery of solvent. For this reason, efforts have already been made to replace these lacquers with aqueous resin dispersions. However, matte coatings generally result. If the coatings are calendered with heat, those coatings made from thermoplastic dispersions adhere to the calender rolls. On the other hand, coatings which are made from self-cross-linking dispersions, although they do not adhere to the rolls, are also insufficiently glossy.

According to British Pat. No. 1,165,222, laminated materials comprising plywood and kraft paper impregnated with phenolic resins have been coated with a mixture of a thermoplastic acrylic resin and of a self-cross-linking acrylic resin dispersion. However, there has not been any post-treatment of the dried coating. According to U.S. Pat. No. 3,249,463, resin-treated fabrics, which have a certain resemblance to decorative papers and are used for similar purposes, have been coated with a final coating of a mixture of different aqueous resin dispersions, among which one may be thermoplastic and another self-cross-linking. Finely dispersed silica is added to this mixture, at least in those cases when hot die embossing of the coated surface is intended. A glossy surface is not obtained by this process, on the one hand because of the presence of the silica additive and, on the other hand, because of embossing with a die having a grained surface.

It has now been found that, surprisingly, a highly glossy surface can be imparted to a decorative paper by impregnating or coating the paper with a filler-free mixture of an aqueous dispersion of a thermoplastic acrylic resin and of an aqueous dispersion of a self-cross-linking acrylic resin. The treated paper is subsequently dried and calendered with a highly-polished calender roll at a temperature between about 120°C. and about 180°C. The invention not only permits a final lacquering without explosion-proof installations and without solvent recovery means, but it also permits combining the resin-impregnation of an untreated decorative paper with the formation of a glossy outer coat and, optionally, also with the lamination of the paper onto a substrate. Further, the sensitivity of the paper surface to organic solvents is decreased by treatment according to the present invention.

Although the behavior of the coating layer formed from the dispersion mixture during calendering has not been investigated in detail, an hypothesis can be advanced for the surpsising formation of gloss according to the process of the invention. However, the scope of the present invention as defined in the following claims is not to be restricted to or limited by any particular theory concerning the condition or behavior of the resin particles. In particular, it is believed that the particles of the self-cross-linking resin in the dispersion sinter together on hot calendering to form an elastic framework of cross-linked resin. As tests with self-cross-linking dispersions alone have shown, this framework is not able to form any completely smooth glossy surface. However, in the present invention, particles of thermoplastic resin lodge in the framework of cross-linked resin and these — under the influence of the pressure and temperature of the calender roll — can flow within a small region from zones of higher pressure to zones of lower pressure and in this manner produce a leveling of any microscopically small unevenness. Although it must be assumed that the surface of the layer comprises thermoplastic resin to a considerable extent as a result of this plastic flow, no adhesion between the resin and the calender roll arises.

The way the process of the invention is carried out depends, in essence, on whether the decorative paper to be treated is already resin-filled and, if this is not the case, whether it is to be bonded with a substrate layer before, during, or after treatment according to the process of the invention.

Resin-filled decorative papers are characterized by a lack of absorbence and by varying degrees of hardness and brittleness. The papers can be impregnated with, for example, aminoplast resins, phenol-formaldehyde resins, polyvinyl acetate, polyvinyl chloride, polyvinylidene chloride, or thermoplastic or cross-linked acrylic resins. It is generally not useful to pass a resin-filled decorative paper — whether or not it is bound to a substrate — through a coating bath for the purpose of providing a superficial or outer coating. In this case, it is simpler to apply the coating mixture continuously by spraying, rolling, painting, or with a doctor blade and then to pass the coated strips directly through a drying tunnel and to a hot calender.

Unfilled decorative papers or insufficiently-filled and still absorbent decorative papers are preferably saturated with the dispersion mixture. This is most simply performed by dipping the papers in, or passing the papers through, a trough. Any excess can be removed with squeeze rolls. The impregnated sheet strip can be applied in a wet condition onto a substrate or, more suitably, can be applied after at least a partial drying. Optionally after final drying, the strip can be firmly bonded to the substrate by a subsequent hot calendering. If the untreated paper is adhered to a substrate prior to impregnation, the dispersion mixture is applied by spraying, with a doctor blade or with a roller, or by painting. In the process the amount of dispersion employed is sufficient for saturation and the paper sheet or strip must be in contact with an excess of the mixture for a sufficient time to permit saturation. Any excess can be removed by rolls, with an air-blade, or other like measures.

In many cases a single impregnation and subsequent calendering of raw unfilled paper does not produce the optimum surface gloss. In these cases it is suitable to apply another thin coating of the dispersion to the resin-filled paper and then, first, to calender. In every case, the decorative paper should be completely filled with resin before the beginning of the calendering process.

When a raw or untreated piece of paper is used as a starting material, that is when immersion into a dispersion mixture is involved, there is a danger that the dispersion particles will wander to the paper surface during drying so that the middle of the paper will be depleted in resin binder. This produces decorative papers which can be readily split. This problem can be met by pre-treating the untreated decorative paper with a polycationic compound, which may be inorganic, such as aluminum sulfate, alum, or calcium chloride, or organic, such as a polymer containing a quaternary ammonium group, e.g., polymethacryloxyethyl-trimethyl-ammonium chloride, and then using for the impregnation a mixture in which at least one of the dispersed resins, preferably the self-cross-linking resin, is an anionically-dispersed material. Likewise, both dispersions can be anionic. In this embodiment, the dispersion particles are fixed in the interior layers of the paper by the polycationic compounds and their outward migration is hindered.

The dispersion mixture suitably contains, as the self-cross-linking acrylic resin, a copolymer comprising from 0.5 to 10 percent by weight of N-methylol-acrylamide or N-methylol-methacrylamide and more than 50 percent by weight of lower alkyl ($C_1 - C_4$) esters of acrylic acid and/or methacrylic acid. Further minor amounts of other vinyl and vinylidene monomers such as acrylonitrile, styrene, vinylidene chloride, and the like, may optionally be present.

Commercially available dispersions of this kind are principally differentiated by the softness or hardness of the films which can be prepared therefrom, for which the measure principally employed is the softening temperature or the temperature of the damping maximum ($T_{\lambda max}$) in the torsion swing test according to DIN 53445. For the process of the present invention, those self-cross-linking resins of the middle-hard to hard types, that is those resins having a $T_{\lambda max}$ value between 35°C. and 60°C. are preferred. Dispersions of this type as a rule contain at least 30 to 40 percent by weight of methyl methacrylate, styrene, or acrylonitrile, alone or in combination. The remainder preferably contains butyl methacrylate or higher alkyl ($C_1 - C_{12}$) methacrylates or acrylates. Copolymers of methyl methacrylate/ethyl acrylate or of methyl methacrylate/butyl acrylate offer special advantages.

As dispersions of thermoplastic resins, those common in commerce are of interest, in which the resins comprise more than 50 percent by weight of lower alkyl ($C_1 - C_4$) esters of acrylic acid and/or methacrylic acid and from 0.1 to 3 percent by weight of acrylic, methacrylic, maleic, fumaric, and/or itaconic acids. These resins may also contain other vinyl and vinylidene monomers, such as the $C_5 - C_{12}$ alkyl acrylates and methacrylates, styrene, acrylonitrile, vinylidene chloride, etc., in minor amounts.

For the present invention, soft to middle-soft thermoplastic resins with $T_{\lambda max}$ values between 0°C. and 30°C. are particularly suitable. In general, these comprise less than 50 percent by weight of methyl methacrylate and/or styrene and/or acrylonitrile, but do contain at least 30 percent by weight of lower alkyl ($C_1 - C_4$) methacrylic acid esters or of methyl acrylate. Preferably the dispersions contain resins comprising methyl methacrylate/ethyl acrylate/acrylic (or methacrylic) acid or methyl methacrylate/butyl acrylate/acrylic (or methacrylic) acid.

Instead of using only one dispersion of a thermoplastic resin and one of a self-cross-linking resin, mixtures of several dispersions of one or the other types, or of both types, can be employed. In this way, the mechanical properties of the decorative paper can be made to match the technical demands of any particular use.

The mixing ratio for the two dispersion types is such that a framework of the cross-linking resin can form from the particles of the self-cross-linking dispersion and, on drying, a sufficiently hard block-free film is formed. Therefore, it is not suitable to use large amounts of relatively soft dispersion resins. In general, the dispersions should be mixed such that the ratio by weight of the self-cross-linking resin to the thermoplastic resin is between 10:1 and 1:1, preferably between 10:1 and 3:1. The miscibility of the dispersions intended to be used should suitably be determined by prior testing. A majority of the types commercially available are anionically or non-ionically stabilized and can in most cases be mixed with materials of the same type or with each other.

The solids content of conventional acrylic resin dispersions is between 40 and 60 percent by weight. In many cases, a mixture of usable consistency is obtained directly on mixing.

For the impregnation of untreated papers, a decrease in viscosity by dilution with water may be appropriate. An impregnation bath should in general not exceed a viscosity of 30 seconds, and preferably is in the region from 14 to 22 seconds, measured in a 4 mm efflux cup[+] according to DIN 53211.

[+] The efflux cup according to DIN 53 211 has a volume of 100 ml. The interior of the cup is 68 mm high and has a maximum diameter of 50 mm. The cup is shaped cylindrically in its upper portion and conically in its lower portion and has a 4 mm efflux opening at the bottom.

In contrast, dispersions of considerably higher viscosity can be used for coating purposes, for example in the range from 14 – 250 seconds, depending on the method of application. The viscosity obtained by mixing the dispersions can be increased in different ways. Dispersions containing resins comprising carboxy groups can be thickened by the addition of bases, particularly of ammonia. Volatile organic solvents, which swell the dispersion particles, similarly effect thickening. Finally, water-soluble polymeric thickening agents such as poly-sodium methacrylate or methyl cellulose can be added.

The mixture should not contain any fillers, since these would interfere with the formation of a highly glossy surface. This does not exclude the possibility that small amounts, for example 0.5 to 2 percent, of a colored pigment, by weight of the dispersion (including the liquid phase) may be added. However, in case coloring is desired, the use of soluble dyes such as quinoline yellow or phthalocyanine blue, for example, is preferred.

If the resistance of the surface of the decorative paper to water and solvents is found to be insufficient, it can be improved by the addition of a water-soluble aminoplast resin, for example a melamine-formaldehyde-precondensate or urea-formaldehyde-precondensate, to the treating dispersion. Such additions can be up to 15 percent, preferably from 3 to 8 percent, by weight of the dry solids in the impregnation and coating mixture.

The coated or impregnated paper is dried before calendering. For this purpose, different arrangements are known such as radiant-heating drying tunnels, hot air circulation, or drying rolls. The drying temperature is suitably between about 100°C. and about 150°C. The dried strip is then passed through a hot calender equipped with a highly-polished steel roll heated to a temperature from about 130°C. to about 180°C. and which exerts a linear pressure of about 50 kilograms of force/centimeter (kgf/cm). The strip can pass consecutively through several calendering arrangements providing the same or different temperature and pressure conditions. The rate of passage through the calender can be between about 40 to about 60 meters/minute. Above this upper limit there may not be a sufficient hardening of the self-cross-linking resin.

The highly polished glossy surface of the calendering roll need not be completely even, for example cylindrical, or need not be even on all portions thereof. Thus, for the achievement of a hammered or peened effect, the surface of the roll may have irregular elevations and depressions, for example. By the presence of stripes arranged in a suitable manner, tile or mosaic patterns, longitudinally or diagonally striped patterns, and the like, can be achieved.

A better understanding of the present invention and of its many advantages will be had by referring to the following specific examples, given by way of illustration, in which the parts recited are parts by weight.

EXAMPLE 1

An untreated paper printed with a decorative pattern and having an area density of 200 g/m² is passed through an impregnation bath comprising:
100 parts of a self-cross-linking anionic acrylate dispersion whose resin portion has a T $_{\lambda\ max}$ = 45°C. and comprises
52 parts of methyl methacrylate,
43 parts of n-butyl acrylate,
4 parts of N-methylol methacrylamide, and
1 part of methacrylamide;
100 parts of a 60 percent thermoplastic anionic acrylic resin dispersion whose resin portion has a T $_{\lambda\ max}$ = 17°C. and comprises
45 parts of methyl methacrylate,
54 parts of n-butyl acrylate, and
1 part of methacrylic acid;
26 parts of a urea-formaldehyde precondensate (commercially available under the tradename "Acrisin FS 017," Roehm GmbH, Germany); and
74 parts of water.

The paper was squeezed to a binder uptake of 100 percent (calculated on the dry weight of the dispersion and of the paper). The paper was then dried to a residual moisture content of 3 – 4 percent in a drying tunnel at 150°C. Susequently, the paper strip was passed through highly-polished steel rolls exerting a linear pressure of 70 kgf/cm at a roll temperature of 150°C. and at a rate of 40 meters/minute without friction. A highly glossy surface was obtained.

EXAMPLE 2

The process according to Example 1 was repeated with the exception that the composition of the impregnation bath was as follows;
80 parts of the self-cross-linking acrylate dispersion of Example 1;
20 parts of the thermoplastic acrylate dispersion of Example 1;
13 parts of the urea-formaldehyde precondensate of Example 1; and
37 parts of water.

A decorative paper having a highly polished surface was obtained.

EXAMPLE 3

A printed raw paper having an area density of 200 g/m² is saturated in an aqueous solution of the ureaformaldehyde precondensate mentioned in Examples 1 and 2 and is squeezed to a binder uptake of 40 – 60 percent, calculated using the dry weight of the resin and the dry weight of the paper. The paper strip is passed through a drying tunnel heated to 120°C. at a rate of 25 meters per minute, which evaporates the water to a residual moisture content of 6 percent and partially, but not completely, condenses the resin.

Then, a mixture comprising 70 parts of the cross-linking acrylic resin dispersion of Example 1 and 30 parts of the thermoplastic acrylic resin dispersion of Example 1 is applied with a doctor blade in an amount of 25 g/m² (based on the weight of dry resin). In a second drying tunnel, the material is completely dried at 150°C. Subsequently, the paper strip is passed through highly polished steel rolls at a roll temperature of 150°C. and a linear pressure of 80 kgf/cm. A highly glossy surface is obtained.

EXAMPLE 4

White, resin-free decorative paper having an area density of 220 g/m² is impregnated with a 10 percent aqueous solution of aluminum sulfate so that it contains 3 percent by weight of aluminum sulfate (by dry weight). After an intermediate drying, the paper strip is treated with a mixture comprising:

500 parts of a 50 percent self-cross-linking anionic acrylic resin dispersion whose resin portion comprises:
  40 parts of methyl methacrylate,
  50 parts of ethyl acrylate,
  5 parts of N-methylol methacrylamide, and
  5 parts of methacrylamide;
30 parts of the condensation product formed between one mol of melamine and four mols of formaldehyde; and
4 parts of a cross-linking agent which is the sulfated and neutralized product of the addition of ethylene oxide to a fatty alcohol mixture, in which adduct an average of twelve ethylene oxide units are present per molecule.

The paper strip is dried and the resin hardened in a drying tunnel at 150°C. It is then coated with 25 g/m² (by dry weight of resin) of a mixture comprising:
  70 parts of the self-cross-linking acrylic resin dispersion earlier mentioned herein; and
  30 parts of a thermoplastic non-ionic acrylic resin dispersion whose resin portion comprises:
    33 parts of methyl methacrylate,
    66 parts of ethyl acrylate, and
    1 part of methacrylic acid.

The coating is dried and hardened in a tunnel at 150°C. and is subsequently smoothed between highly polished steel rolls at a temperature of 150°C. and at a linear pressure of 70 kgf/cm.

A similar result is obtained if the raw paper is treated with a 1 percent aqueous solution of poly(methacryloxyethyl-trimethyl ammonium chloride), instead of aluminum sulfate, then dried and impregnated with the resin dispersion described above.

What is claimed is:

1. A method for making a glossy resin-filled paper which comprises contacting the paper to be treated with a filler-free resin dispersion consisting essentially of (1) a thermoplastic acrylic resin and (2) a self-cross-linking acrylic resin, both dispersed in water, the ratio by weight of thermoplastic resin to self-linking resin in said dispersion being between about 1:1 and about 1:10, drying the treated paper, and then calendering the dried paper with a highly polished calender roll at a temperature between about 120°C. and about 180°C.

2. A method as in claim 1 wherein said paper to be treated and said resin dispersion are contacted by immersing the paper in the dispersion.

3. A method as in claim 1 wherein said paper to be treated is at least partially resin-filled prior to contacting with said resin dispersion by applying a layer of said dispersion to the surface thereof.

4. A method as in claim 1 wherein said thermoplastic resin has a $T_{\lambda\,max}$ between about 0°C. and about 30°C., and said self-cross-linking resin has a $T_{\lambda\,max}$ between about 35°C. and about 60°C.

5. A method as in claim 1 wherein said dispersed thermoplastic acrylic resin (1) is a copolymer comprising more than 50 percent by weight of at least one lower alkyl ester of acrylic acid or methacrylic acid and from 0.1 to 3 percent by weight of acrylic, methacrylic, maleic, fumaric, and itaconic acid, and said self-cross-linking acrylic resin (2) is a copolymer comprising more than 50 percent by weight of at least one lower alkyl ester of acrylic acid or methacrylic acid and from 0.5 to 10 percent by weight of N-methylol acrylamide and N-methylol methacrylamide.

6. A method as in claim 1 wherein said dispersion additionally comprises an aminoplast resin in an amount of to about 15 percent by weight of the total dispersed solids.

7. A method as in claim 2 which additionally comprises impregnating said paper to be treated with a polycationic compound prior to contacting it with said dispersion by immersing the paper in the dispersion, and wherein at least one of said dispersed thermoplastic and self-cross-linking resins is anionically dispersed.

8. A method as in claim 2 wherein said paper to be treated is substantially resin-free prior to immersing it in said resin dispersion.

9. A glossy resin-filled paper prepared by the method of claim 1.

* * * * *